United States Patent [19]

Yoshida

[11] Patent Number: 5,140,478

[45] Date of Patent: Aug. 18, 1992

[54] MAGNETIC DISK DRIVE COMPRISING MAGNETIC DISK CARTRIDGE AND DRIVING DEVICE WHICH DRIVES THE DISK CARTRIDGE AND PREVENTS EXTERNAL VIBRATION FROM BEING TRANSMITTED TO THE DISK CARTRIDGE

[75] Inventor: Kobun Yoshida, Sayama, Japan

[73] Assignee: Teac Corporation, Tokyo, Japan

[21] Appl. No.: 615,882

[22] Filed: Nov. 20, 1990

[30] Foreign Application Priority Data

Nov. 22, 1989 [JP] Japan .............................. 1-135534[U]

[51] Int. Cl.⁵ ...................... G11B 5/012; G11B 17/00; G11B 17/04
[52] U.S. Cl. ................................. 360/97.01; 360/99.06
[58] Field of Search ............... 360/97.01, 98.04–98.06, 360/99.06–99.07

[56] References Cited

U.S. PATENT DOCUMENTS 4,754,397 6/1988 Varaiya ....................... 360/97.01 X 4,812,932 3/1989 Hishinuma ....................... 360/97.01

OTHER PUBLICATIONS

Taiwan reference is from the manual for Syquist 555 disk drive pp. 2-2, 2-3, 2-6 and 3-1.

*Primary Examiner*—A. J. Heinz
*Attorney, Agent, or Firm*—Michael N. Meller

[57] ABSTRACT

An exchangeable hard disk drive including a disk cartridge functioning as a hard disk and a driving device which drives the disk cartridge and prevents external vibration from being transmitted to the disk cartridge. The driving device has a holder into which the disk cartridge is inserted and from which the disk cartridge is ejected and the holder is supported vibro-isolatingly by a vibro-isolating member. In addition, when the disk cartridge is inserted into the holder, they are coupled together. Therefore, the disk cartridge is indirectly supported vibro-isolatingly when the disk cartridge is inserted into the holder. Consequently, the disk cartridge is hardly subjected to the external vibration.

15 Claims, 15 Drawing Sheets

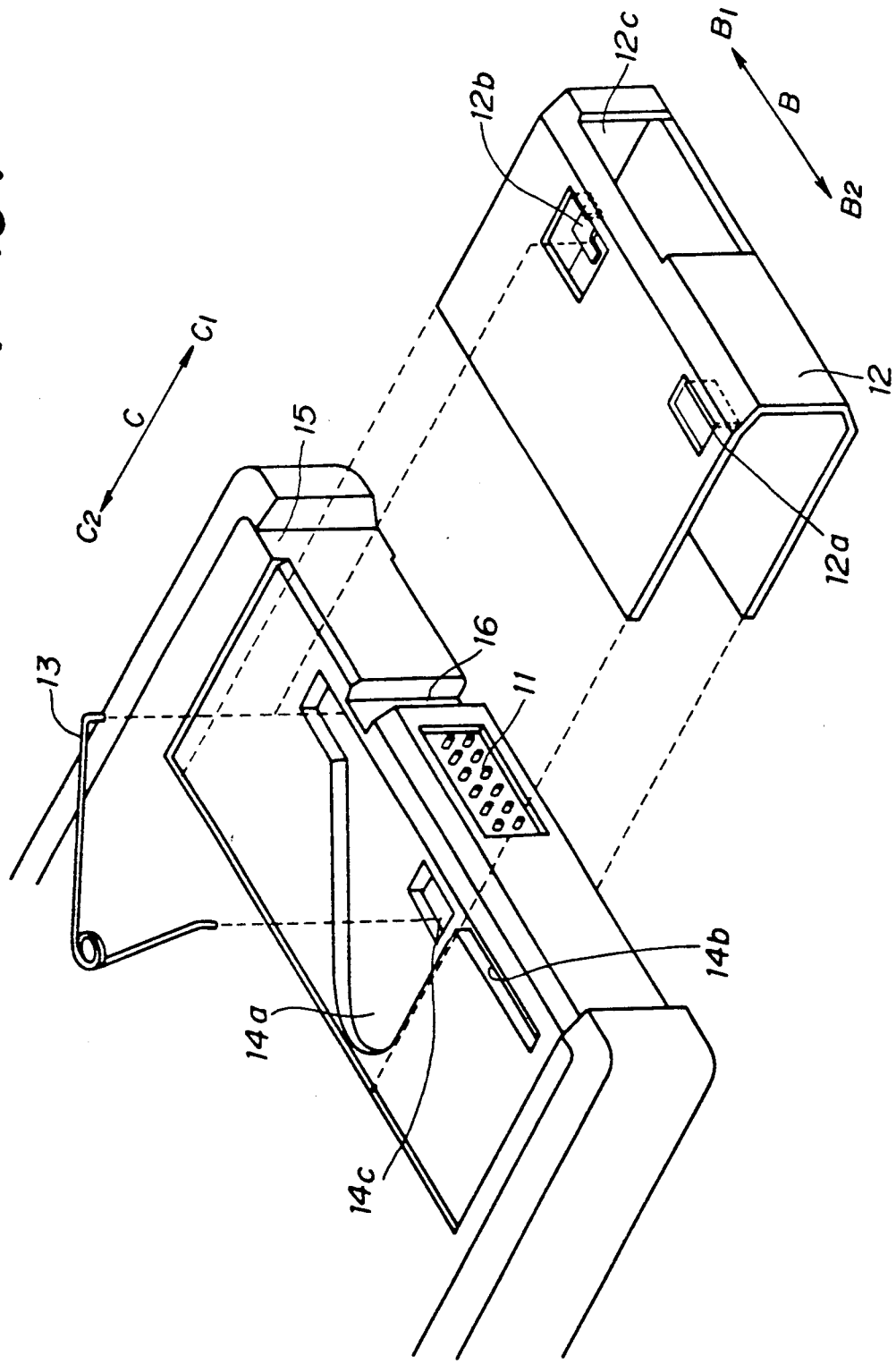

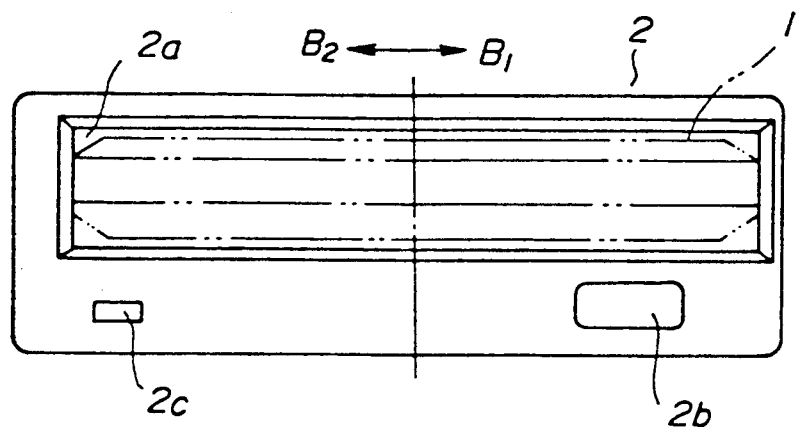
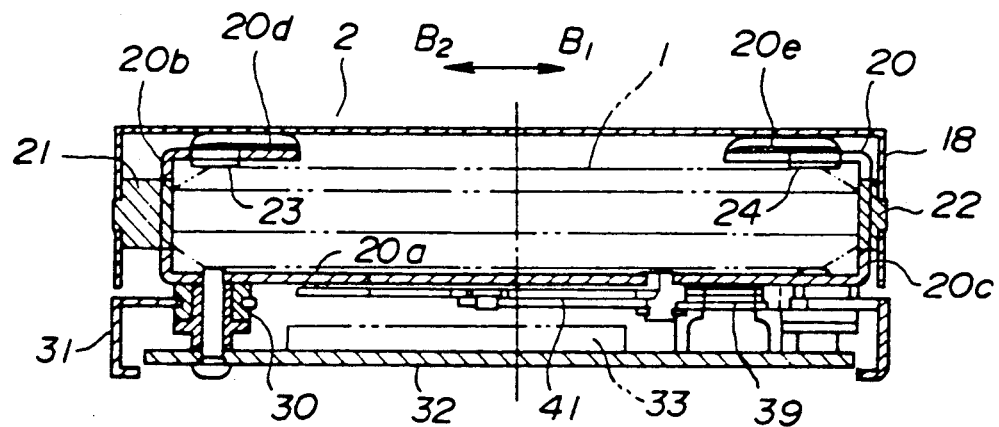
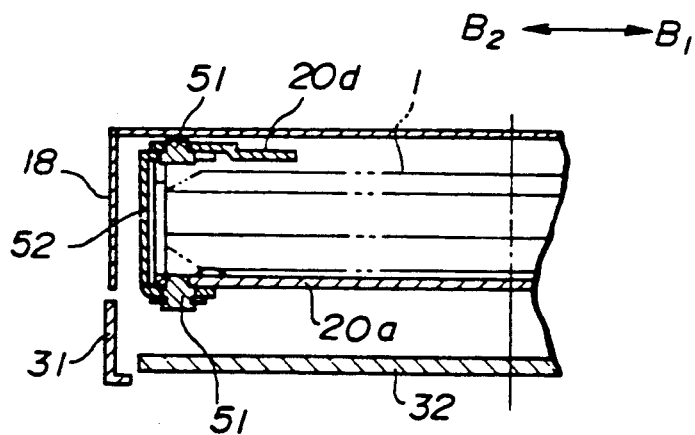

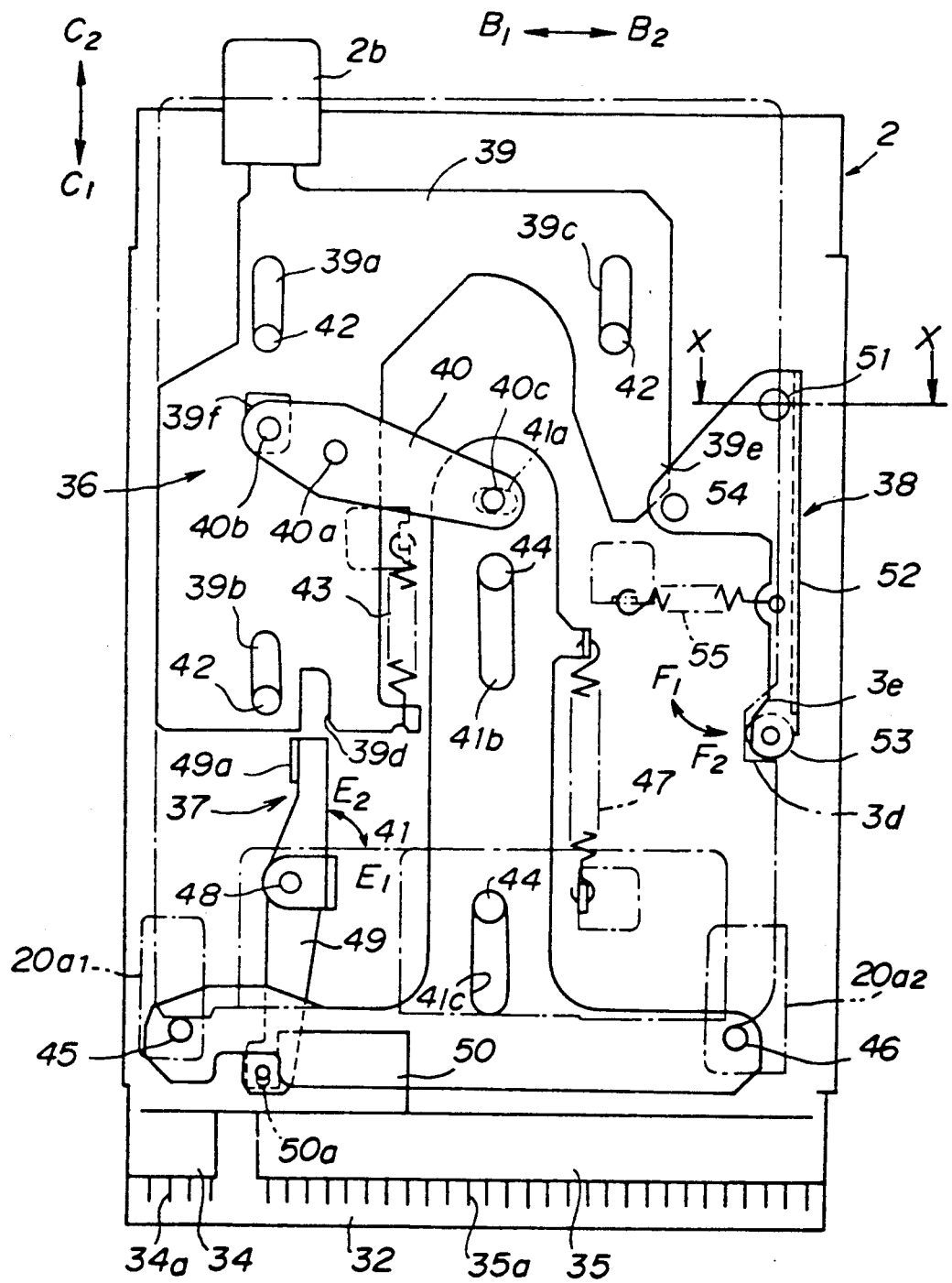

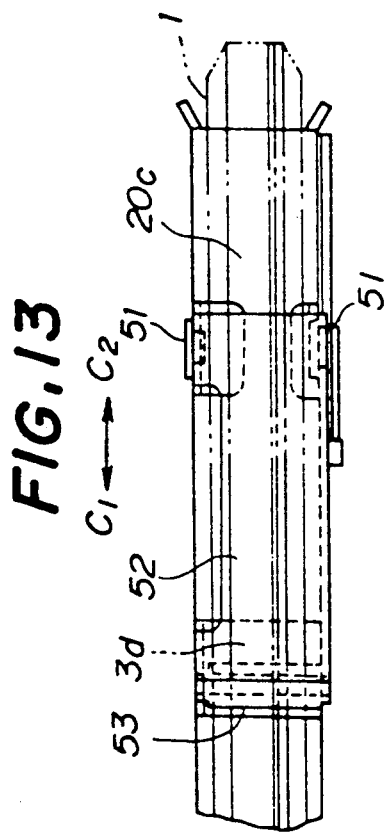
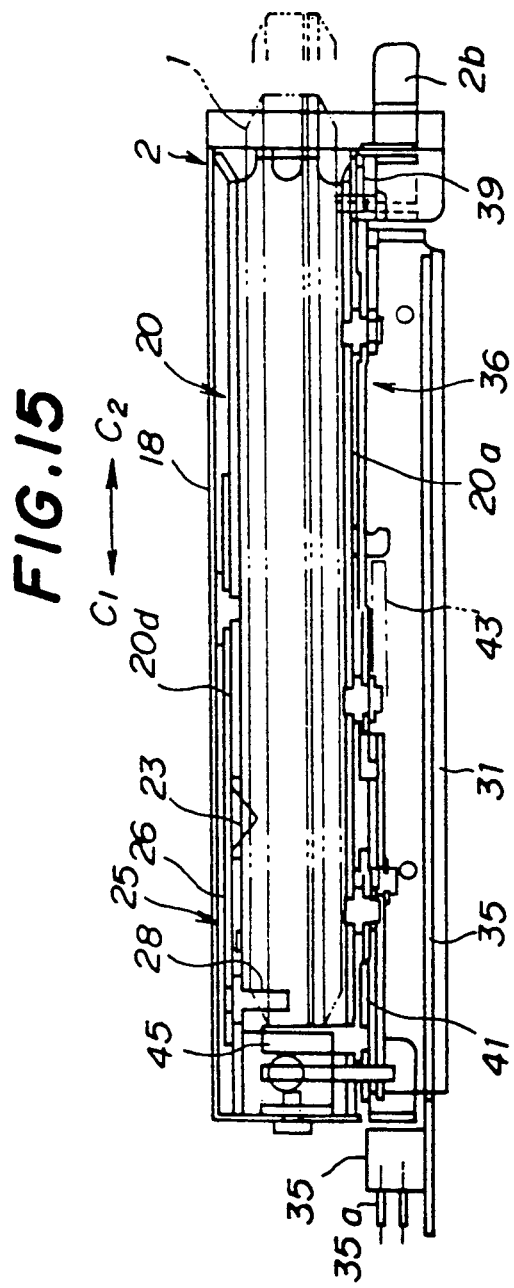

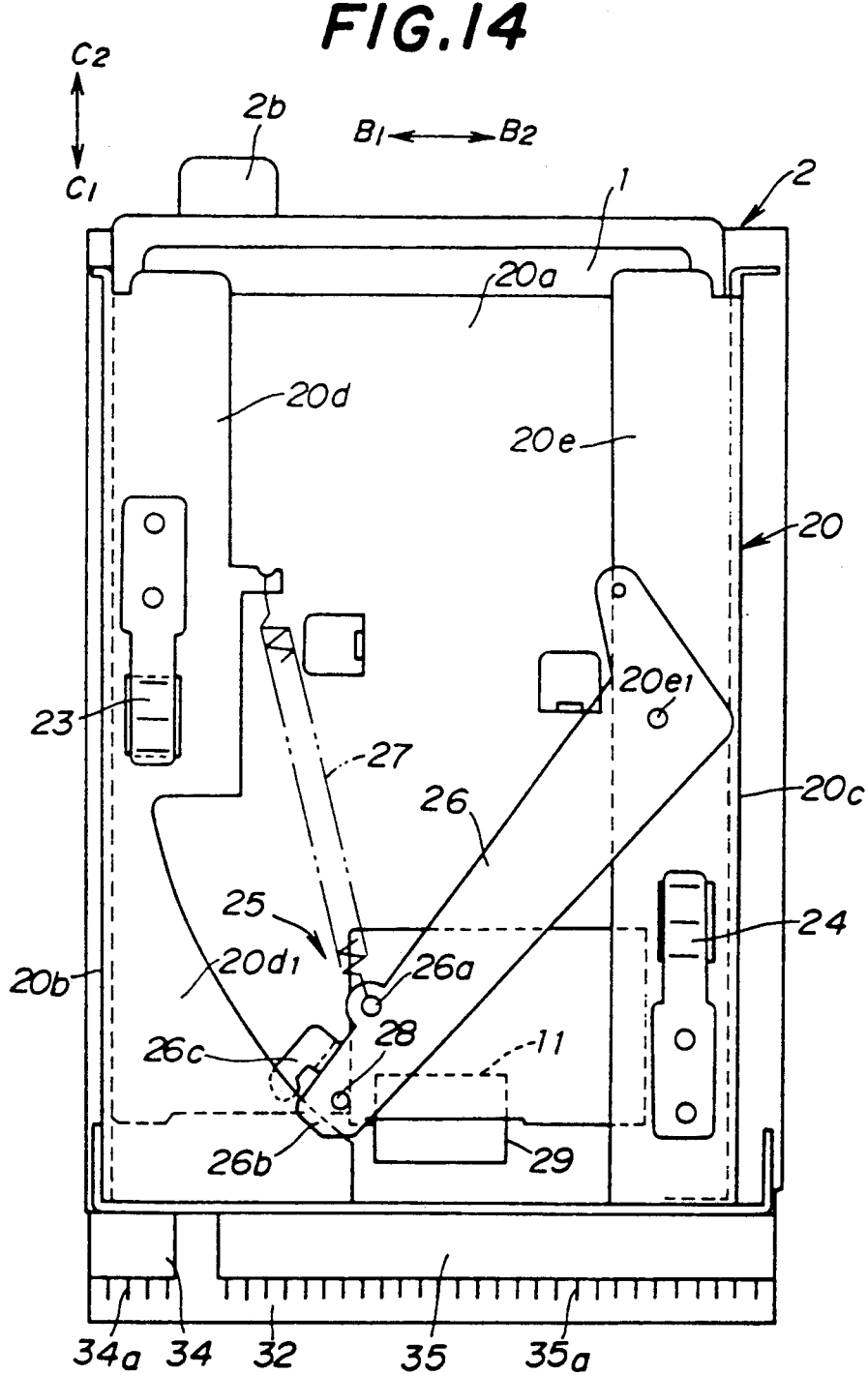

5,140,478

MAGNETIC DISK DRIVE COMPRISING MAGNETIC DISK CARTRIDGE AND DRIVING DEVICE WHICH DRIVES THE DISK CARTRIDGE AND PREVENTS EXTERNAL VIBRATION FROM BEING TRANSMITTED TO THE DISK CARTRIDGE

BACKGROUND OF THE INVENTION

The present invention relates generally to magnetic disk drives, and more particularly to a magnetic disk drive which comprises a disk cartridge and a driving device. The term "a disk cartridge", as used herein, means an apparatus which comprises at least a disk and a head in a sealed case, but has no current supply source to drive them and has no controller to control them. The term "a driving device", as used herein, means an apparatus which has the current supply source and/or the controller.

Among magnetic disk drives, hard disk drives have been used as memory means for computers. Hard disks have been more improved than so-called floppy disks in TPI (track per inch) and BPI (bit per inch) so that the hard disks can be recorded with high density. The hard disk is fixed in a sealed-up housing to prevent dust from the outside attaching itself thereon so that it can be recorded with high density.

Consequently, information recorded on the hard disk cannot be used generally except in a computer which includes the hard disk drive. And when the hard disk is overflown, as the disk cannot be easily exchanged, it is troublesome to exchange the hard disk drive itself.

Accordingly, this applicant has developed the disk drive comprising the disk cartridge and the driving device. The disk cartridge can be easily connected to and disconnected from the driving device. The driving device may be connected to an external computer, such as a host computer, and the disk cartridge can be driven and controlled by the driving device and/or the external computer. Therefore the disk cartridge may be considered as being an easily exchangeable hard disk.

Since the disk cartridge has a magnetic disk and a magnetic head, both tend to collide with each other when they are subjected to external vibration. In a conventional external device including a hard disk drive therein, the hard disk drive is usually supported vibro-isolatingly at an attachment surface inside the external device.

But when an attempt is made to apply the conventional method to the magnetic disk drive, there occurs the following disadvantage. It is difficult to connect the disk cartridge to the driving device if springs and rubber which are used for the vibro-isolating supporting are located between the disk cartridge and the driving device.

SUMMARY OF THE INVENTION

Accordingly, it is a general object of the present invention to provide a novel and useful magnetic disk drive in which the disadvantage described above are eliminated.

Another object of the present invention is to provide a magnetic disk drive comprising a disk cartridge and a driving device, in which the disk cartridge is supported vibro-isolatingly and the disk cartridge is easily connected to the driving device.

The more specific object of the present invention is to provide a magnetic disk drive which comprises a disk cartridge and a driving device into which the disk cartridge is inserted and from which the disk cartridge is ejected, wherein the disk cartridge comprises a magnetic disk, and a magnetic head for recording information on the disk and/or reproducing information therefrom, and wherein the driving device comprises a housing, a connecting member mounted inside the housing, a holder, fixed to the connecting member, the holder having a load position therein, the disk cartridge being able to be inserted into the holder up to the load position and ejected from the holder, the magnetic disk and/or the magnetic head being, able to be driven when the disk cartridge is inserted with a first orientation into the load position, a vibro-isolating member via which the holder is connected to the connecting member, a combining member, one end of which is combined with the holder and the other end of which is combined with the disk cartridge inserted into the holder, for combining the disk cartridge with the holder when the disk cartridge is inserted into the load position, and a current supply source from which electricity is supplied to the disk cartridge in order to drive the magnetic disk and/or the magnetic head when the disk cartridge is inserted into the load position.

According to the present invention, the holder is supported vibro-isolatingly by the vibro-isolating member, and the holder and the disk cartridge are combined in a body so that the disk cartridge can be regarded as being supported vibro-isolatingly. Consequently, the disk cartridge is hardly subjected to external vibration so that the magnetic head can stably record information on the magnetic disk and/or reproduce it therefrom.

Other objects and further features of the present invention will be apparent from the following detailed description when read in conjunction with the accompanying drawings.

BRIEF DESCRIPTION OF THE DRAWINGS

FIG. 4(A), FIG. 4(B) and FIG. 4(C) are respectively a plane view, a cross-sectional view and a perspective view for explaining the operation of the shutter;

FIG. 7 is a front view of a driving device;

FIG. 9 is a cross-sectional view taken along line VIII—VIII shown in FIG. 8;

FIG. 10 is a plane view for explaining each mechanism in the driving device;

FIG. 11 is a front view taken along line X—X shown in FIG. 10;

FIG. 13 is a side view of a mis-eject preventing mechanism;

FIG. 14 is a cross-sectional view for explaining the on-off shutter mechanism;

FIG. 15 is a cross-sectional view of a holder in which the disk cartridge is inserted;

DESCRIPTION OF PREFERRED EMBODIMENTS

Figure 1:
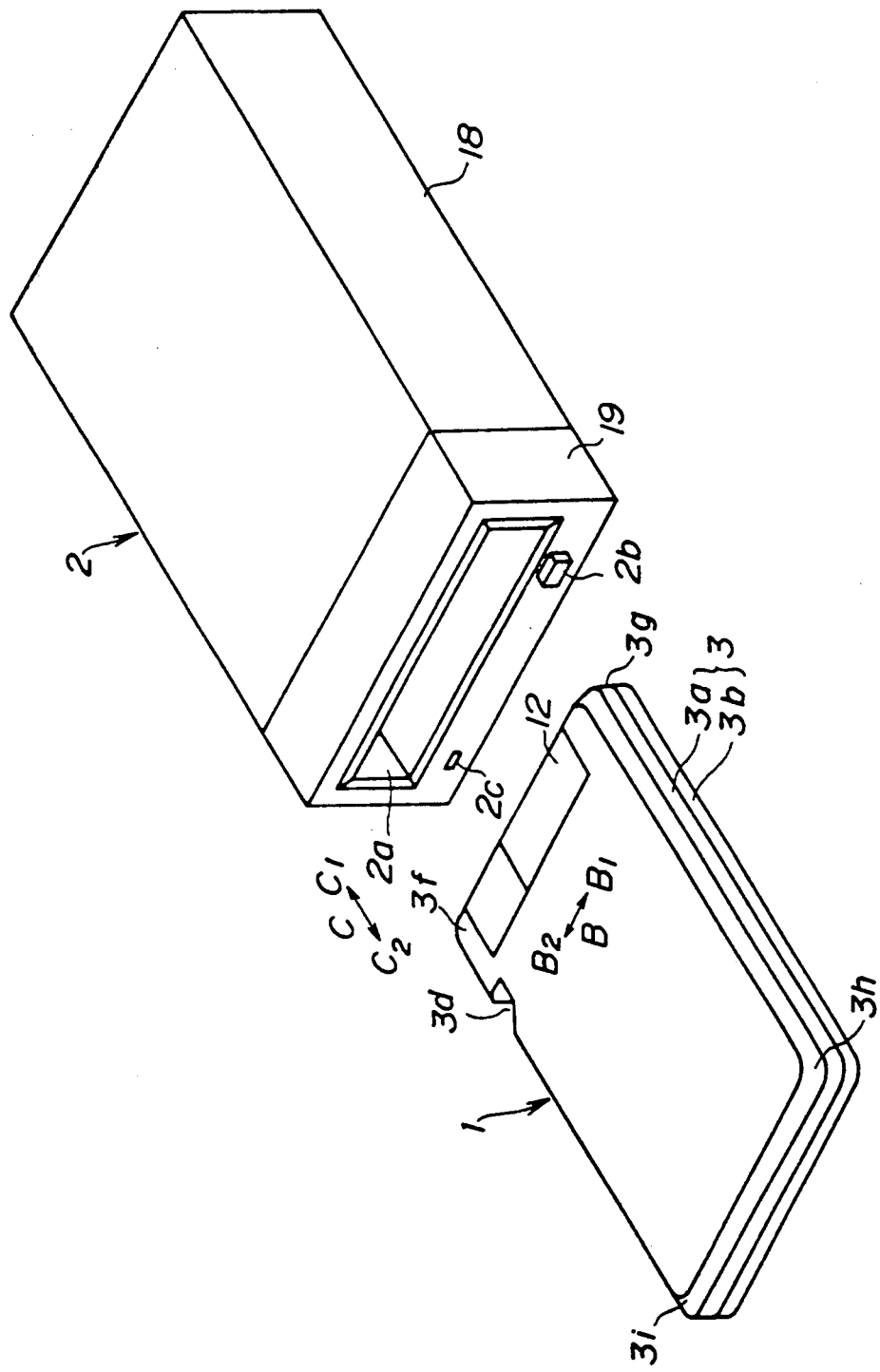
FIG. 1 is a perspective view of a magnetic disk drive according to the present invention.

A detailed description will now be given of a magnetic disk drive according to the present invention. Referring to FIG. 1, the magnetic disk drive comprises a disk cartridge 1 and a driving device 2. The driving device 2 supplies electric power to the disk cartridge 1 to drive it while the disk cartridge 1 is inserted into the driving device 2 from a frontal insert entrance 2a. The disk cartridge 1 can be easily inserted into and ejected from the driving device 2, and it is to be inserted only when it is used like a floppy disk. A plurality of disk cartridges with different memory capacities may be prepared, and one of them may be selected depending upon the kind or amount of information.

The driving device 2 is connected to an external computer (not shown). Therefore it is possible to transfer the information easily from the computer to the disk cartridge 1.

Figure 2A:
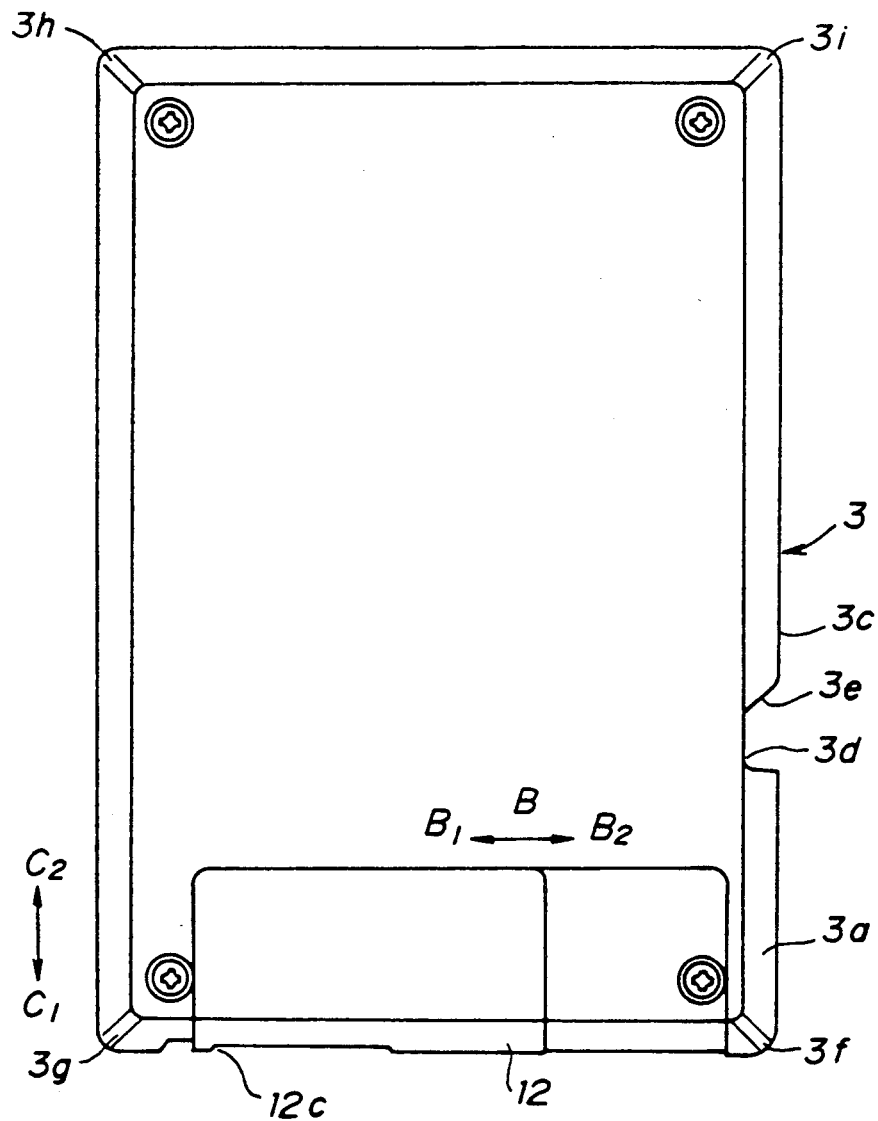
FIG. 2(A) and FIG. 2(B) are respectively a plane view and a front view of a disk cartridge shown in FIG. 1.
Figure 2B:
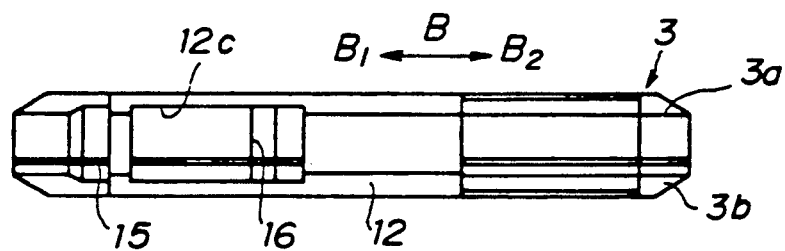
Figure 3A:
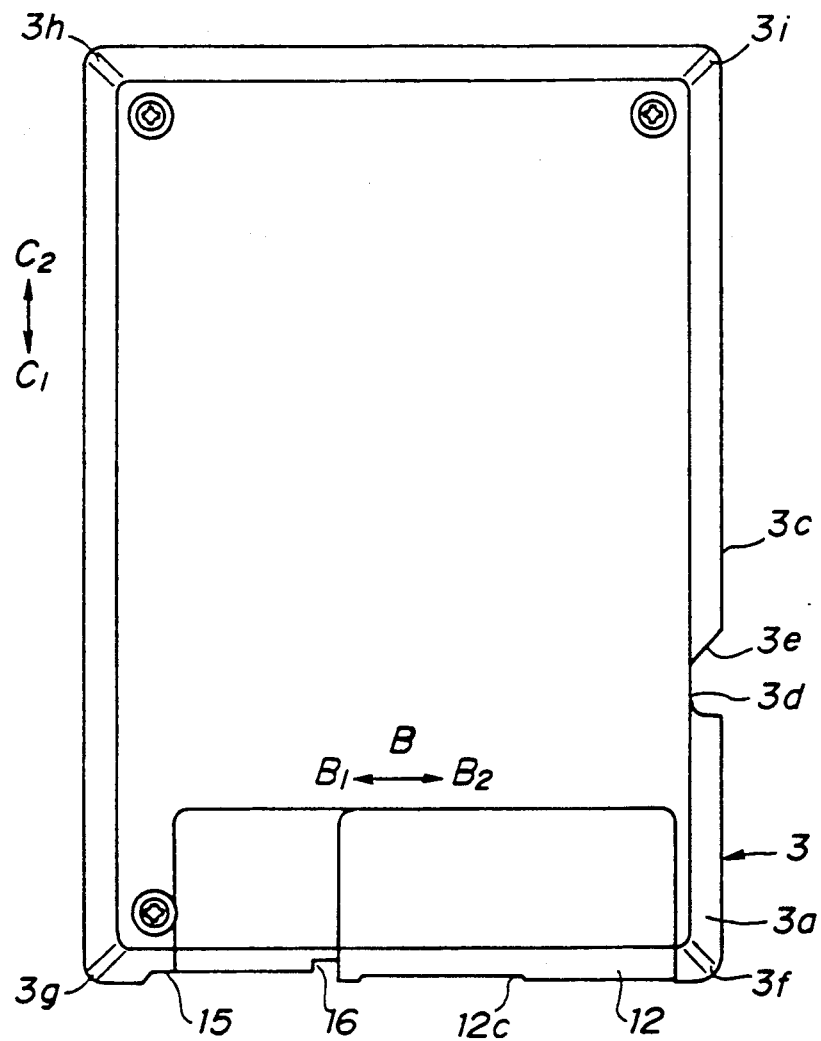
FIG. 3(A) and FIG. 3(B) are respectively a plane view and a front view of the disk cartridge when a shutter opens.
Figure 3B:
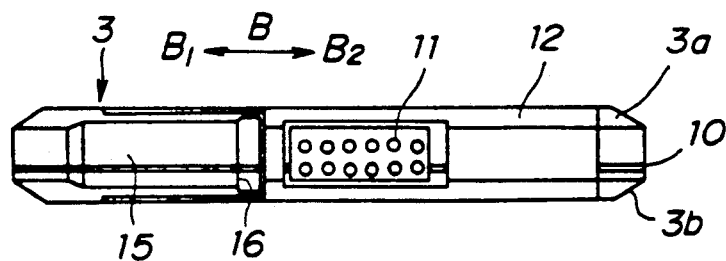
Figure 4A:
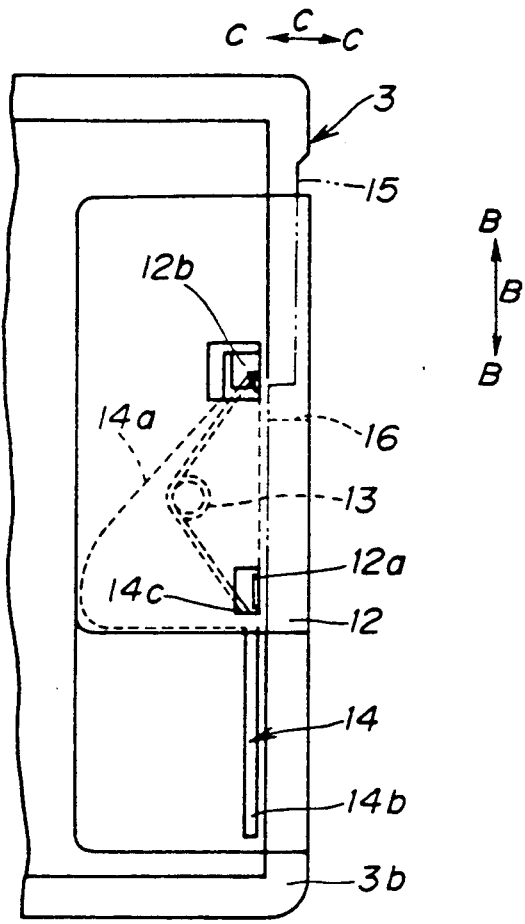
Figure 4B:
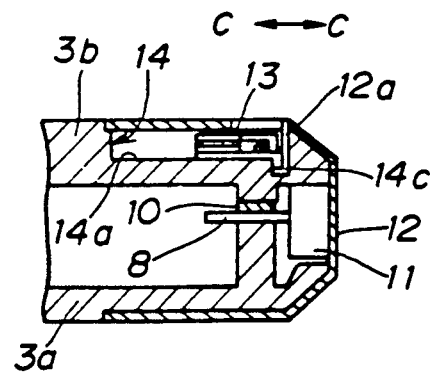

In this embodiment, the disk cartridge 1 has a single hard disk, however, needless to say, the present invention can be applied to a plurality of disks. As shown in FIG. 1 and FIG. 2, the disk cartridge 1 is enclosed in a sealed-up case 3 to prevent dust from attaching itself thereto. As shown in FIG. 4(B), the case 3 comprises an upper case 3a and a lower case 3b, and located in the junction between them is an elastic member 10 which keeps the case 3 airtight. The electric power is supplied from the driving device 2 to the disk cartridge 1 via a connector 11. The connector 11 is connected with a junction 8b of a flexible printed circuit board 8, and the electric power is supplied to every part of the disk cartridge 1 via the flexible printed circuit board 8.

Figure 5:
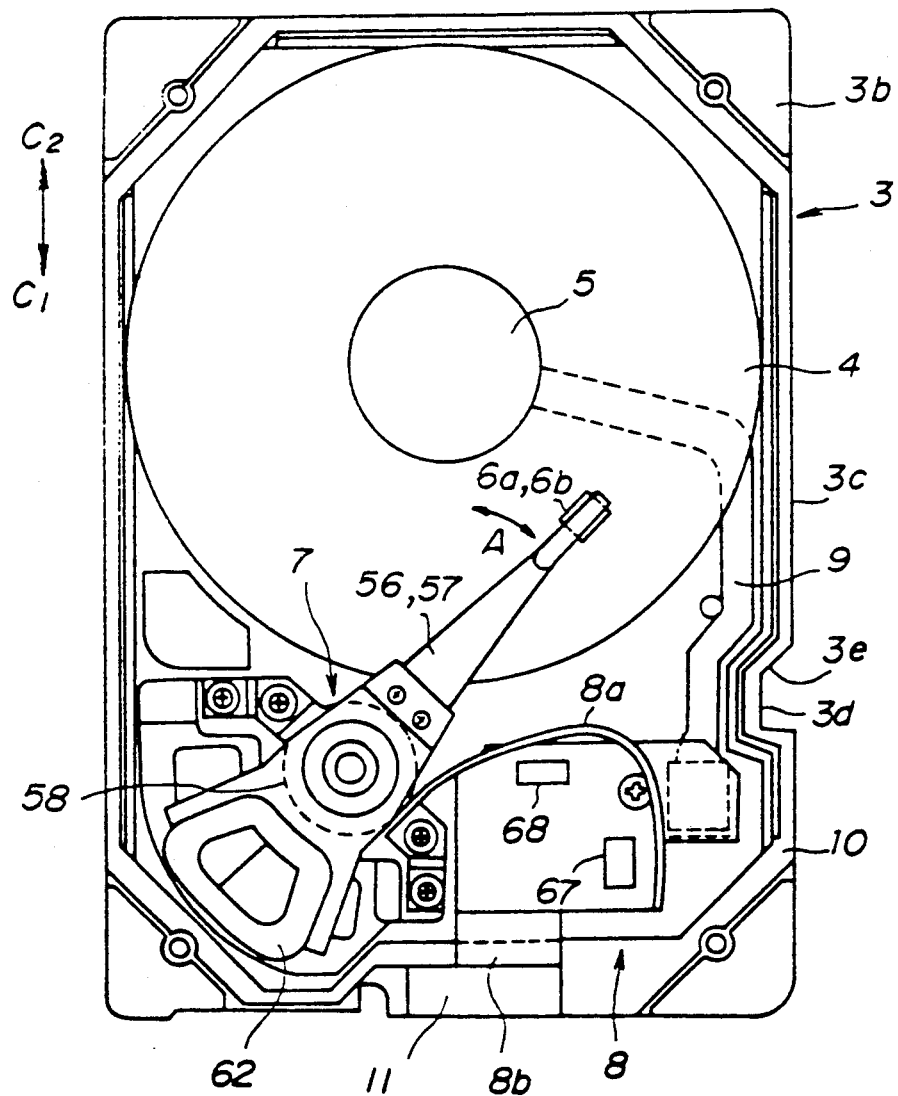
FIG. 5 is a plane view of the disk cartridge without an upper case.
Figure 6:
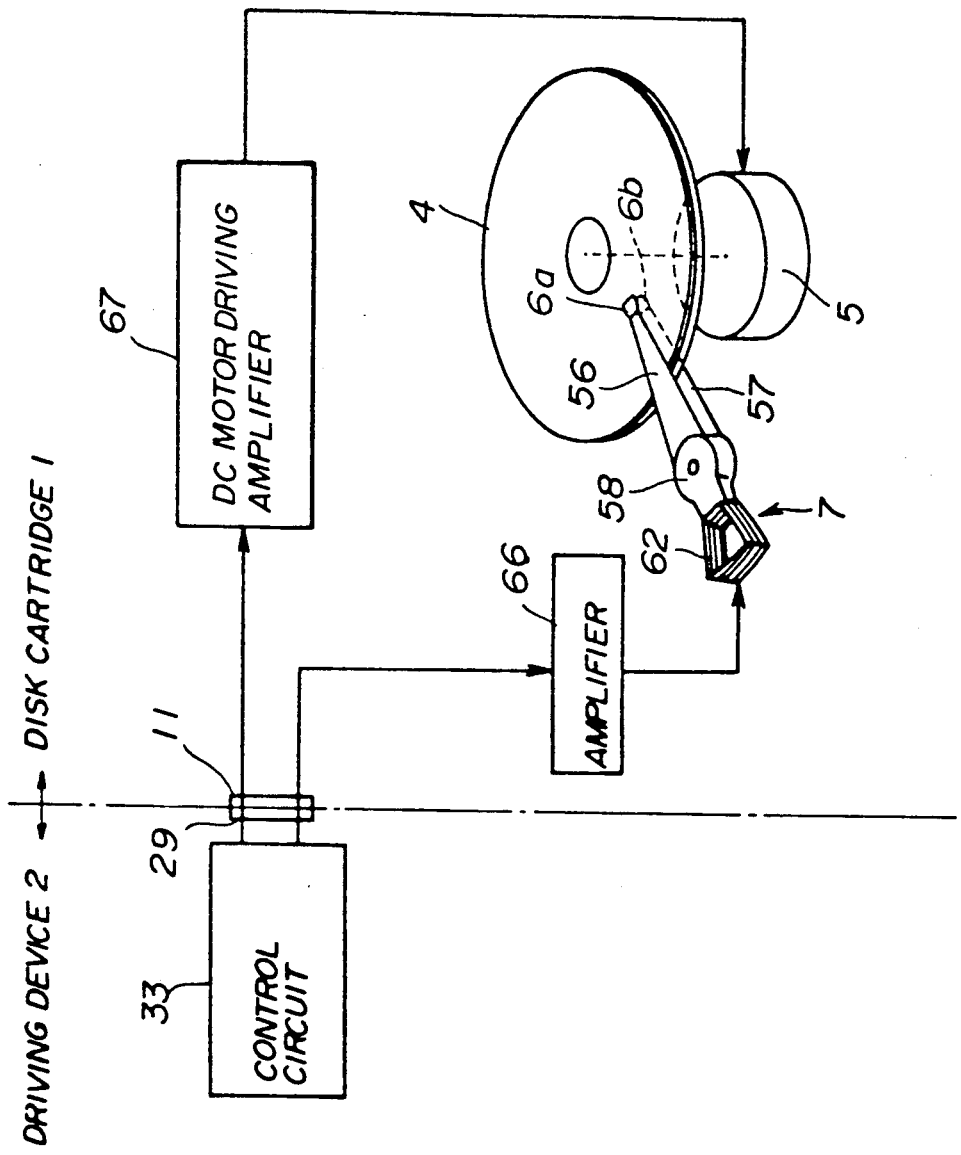
FIG. 6 is a system block diagram showing a general circuit arrangement which drives an actuator and a motor.

The disk cartridge 1 comprises a magnetic disk 4, a spindle motor 5 to rotate the disk 4, magnetic heads 6a and 6b, a pair of head arms 56 and 57 with magnetic heads 6a and 6b at the tops thereof, and an actuator 7 for swinging the head arms 56 and 57. The disk cartridge 1 has a disk rotating mechanism for rotating the disk 4 when it is recorded or reproduced. As shown in FIG. 5 and FIG. 6, the disk rotating mechanism comprises the spindle motor 5, a rotor (not shown), and a DC motor driving amplifier 68. The disk 4 is fixed around the rotor of the motor 5 and both rotate together. The rotating speed of the motor 5 is determined by the amplifier 68, and controlled by a control circuit 33. The electric power is supplied to the motor 5 by the flexible printed circuit board 8 via a junction code 9. The junction code 9 is pulled out via the side of the housing of the motor 5 and connected with the flexible printed circuit board 8.

Also the disk cartridge 1 has a head moving mechanism. The head moving mechanism is a mechanism for moving the heads 6a and 6b in an approximately radial direction of the disk 4, however, strictly speaking, it further includes a mechanism for moving the heads 6a and 6b from a recording position to a waiting position. The term "a recording position", as used herein, means a position of any one of the tracks on the disk 4. And the term "a waiting position", as used herein, means a position apart from the tracks on the disk 4. The head moving mechanism comprises magnetic heads 6a and 6b, head arms 56 and 57, an actuator 7 shown in FIG. 5, and an amplifier 67 shown in FIG. 6. As shown in FIG. 5 and FIG. 6, the actuator 7 rotates in the direction A, and moves the heads 6a and 6b in the approximate radial direction of the disk 4. The actuator 7 rotates by means of a supporting member 58. The actuator 7 and the heads 6a and 6b are electrically connected with the junction 8b via a wire 8a of the flexible printed circuit board 8. When the driving coil 62 is energized, the supporting member 58 rotates and the heads 6a and 6b move approximately radially on the disk 4 on the basis of the Fleming's rule. Rotation of the actuator 7 is also controlled by the control circuit 33 shown in FIG. 6. After recording and/or reproducing, the head arms 56 and 57 rotate clockwise. Because the disk cartridge 1 of the present invention is easily ejected and carried, it is easily subject to vibration. Accordingly, the heads are held not at the most inner track on the disk, but at the waiting position so that they do not crash the disk.

The driving device 2 has five mechanical mechanisms which cooperate with the disk cartridge 1, such as a loading mechanism, mis-insert preventing mechanism, on-off shutter mechanism, ejecting mechanism, and mis-eject preventing mechanism. A description will be given of the above five mechanical mechanisms. The driving device 2 has, as shown in FIG. 1 and FIG. 7, the insert entrance 2a, an eject button 2b and an indicator 2c at a frontal panel 19. The indicator 2c indicates the recording or reproducing of the disk cartridge 1.

Figure 17:
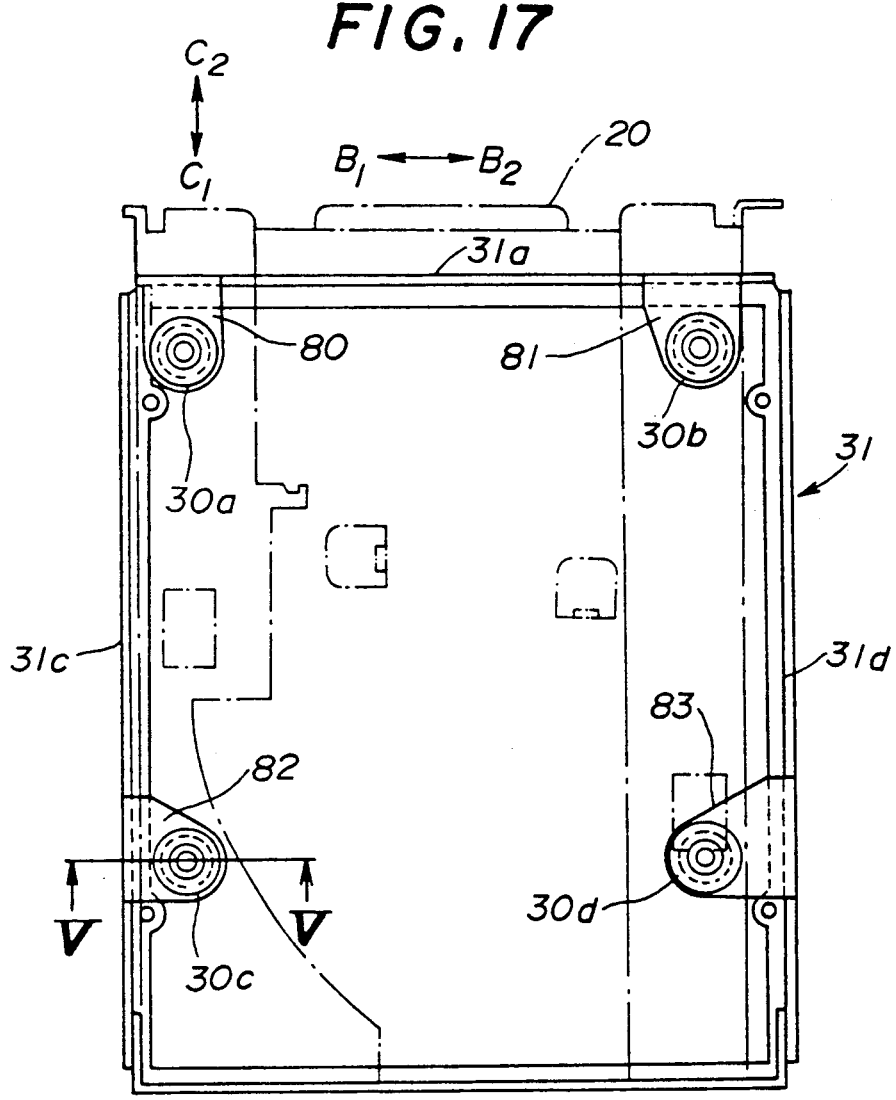
FIG. 17 is a plane view of a chassis.

First of all, the loading mechanism will be described below. The loading mechanism is a mechanism for loading the disk cartridge 1 inside the driving device 2 when the disk cartridge 1 is inserted with a correct orientation via the insert entrance 2a. The loading mechanism comprises a holder 20. As shown in FIG. 8, FIG. 9, and FIGS. 17 through 19, the holder 20 is located inside a housing 18 of the driving device 2. The holder 20 comprises a base plate 20a, side plates 20b and 20c and crown plates 20d and 20e. The side plates 20b and 20c are bent upward from the base plate 20a. The crown plates 20d and 20e are bent respectively from the side plates 20b and 20c and are parallel and opposite to the base plate 20a. As shown in FIG. 13, both side plates 20b and 20c are fixed on the housing via supporting members 21 and 22. And the base plate 20a is fixed on the base 32 with a chassis 31 via a vibro-isolating members 30. The driving device 2 is fixed on the external device via the chassis 31. The crown plates 20d and 20e respectively have flat springs 23 and 24 which compress and hold the disk cartridge 1 while it is inserted. Thus, if the disk cartridge 1 is inserted with a correct orientation, it is held by the flat springs 23 and 24, and fixed inside the driving device 2. A connector 29 of the driving device 2 is connected with a connector 11 of the disk cartridge 1, and electric power is supplied by the driving device 2 to the disk cartridge 1 via the connectors 29 and 11. If an attempt is made to insert the disk cartridge 1 with a wrong orientation, it is prevented from being inserted by the mis-insert preventing mechanism. And the shutter 12 which encloses the connector 11 is opened or closed by the on-off shutter mechanism. The chassis 31 is a rectangular shaped frame as shown in FIG. 17. The chassis 31 comprises a front plate 31a, a back plate 31b, and side plates 31c and 31d. The front plate 31a has supporting parts 80 and 81, and the side plates 31c and 31d have supporting parts 82 and 83, respectively.

These supporting parts 80 to 83 have vibro-isolating members 30 (30a to 30d), respectively. Each vibro-isolating member is composed of an elastic member, such as rubber. As these supporting parts 80 to 83 which almost the same respective constructions, only the supporting part 82 will now be described in detail.

Figure 19:
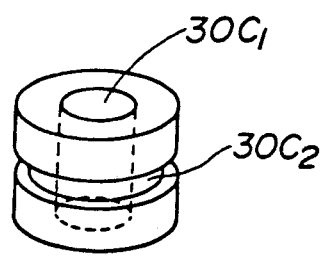
FIG. 19 is a perspective view of an essential part of a vibro-isolating member.
Figure 18:
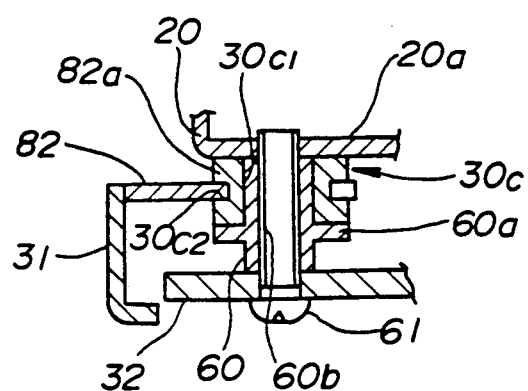
FIG. 18 is a cross-sectional view taken along line V—V shown in FIG. 17.

As shown in FIG. 18 and FIG. 19, the vibro-isolating member 30c has a hollow cylinder shape with a side groove, and comprises a hollow $30c_1$ and a groove $30c_2$. A spacer 60 which is fixed by a screw 61 between a base 32 and the holder 20 is inserted into the hollow $30c_1$. The spacer 60 has a brim 60a, and the vibro-isolating member 30c is fixed between the holder 20 and the brim 60a of the spacer 60. The supporting part 82 is engaged with the groove $30c_2$ of the vibro-isolating member 30c. The groove $30c_2$ is not so deep that it reaches the hollow $30c_1$. Therefore, as shown in FIG. 18, the holder 20 is hardly subjected to the vibration to which the supporting part 82 is subjected because it is damped by the vibro-isolating member 60c. On the other hand, vibration from the base 32 is also damped by the vibro-isolating member 30c, and then it is transmitted to the holder 20. Accordingly, the holder 20 is hardly subjected to the vibration caused by the chassis 31 or the base 32 because it is damped by the vibro-isolating member 30c. On the other hand, if the disk cartridge 1 is combined with the holder 20 when it is inserted into the holder 20, neither the holder 20 nor the disk cartridge 1 will be subjected to the vibration. Therefore, in this embodiment, the disk cartridge 1 is pushed so as to be fixed together with the holder 20 by the flat springs 23 and 24 from the top thereof, and by a roller 53 of the mis-insert preventing mechanism 38 from the side thereof, so that the disk cartridge 1 and the holder 20 are combined in a body.

The mis-insert preventing mechanism 38 is a mechanism for allowing the disk cartridge 1 to be inserted with only the correct orientation. A description will be given of the mis-insert preventing mechanism with reference to FIG. 2(A), and FIG. 10 through FIG. 13. The mis-insert preventing mechanism comprises a lock lever 52, the roller 53, and a pin 54 of the driving device 2, and a lock-groove 3d and the corners 3f through 3i of the disk cartridge 1. One of the characteristics of the mis-insert preventing mechanism 38 according to the present invention, is that the roller 53 holds the disk cartridge 1 inserted with the correct orientation at the predetermined position, and, blocks the disk cartridge 1 inserted with the wrong orientation from being loaded into the predetermined position. The lock-groove 3d is formed on the case 3 at the right side 3c shown in FIG. 2(A). The lock-groove 3d has an inclined plane 3e which is inclined to the eject direction ($C_2$ direction). The corner 3f is chamferred with a larger radius than other corners $3_g$ through 3i. The lock lever 52 is mounted on the side plate 20c pivotably around shafts 51. The roller 53 is located at the end of the locking lever 52, and can be engaged with the corner 3f and the lock-groove 3d. The roller 53, lock-groove 3d and corner 3f may be arranged differently from this embodiment as long as the roller 53 can be engaged with the lock-groove 3d and the corner 3f. The pin 54 slidably touches the pushing portion 39e of the eject lever 39.

Figure 12:
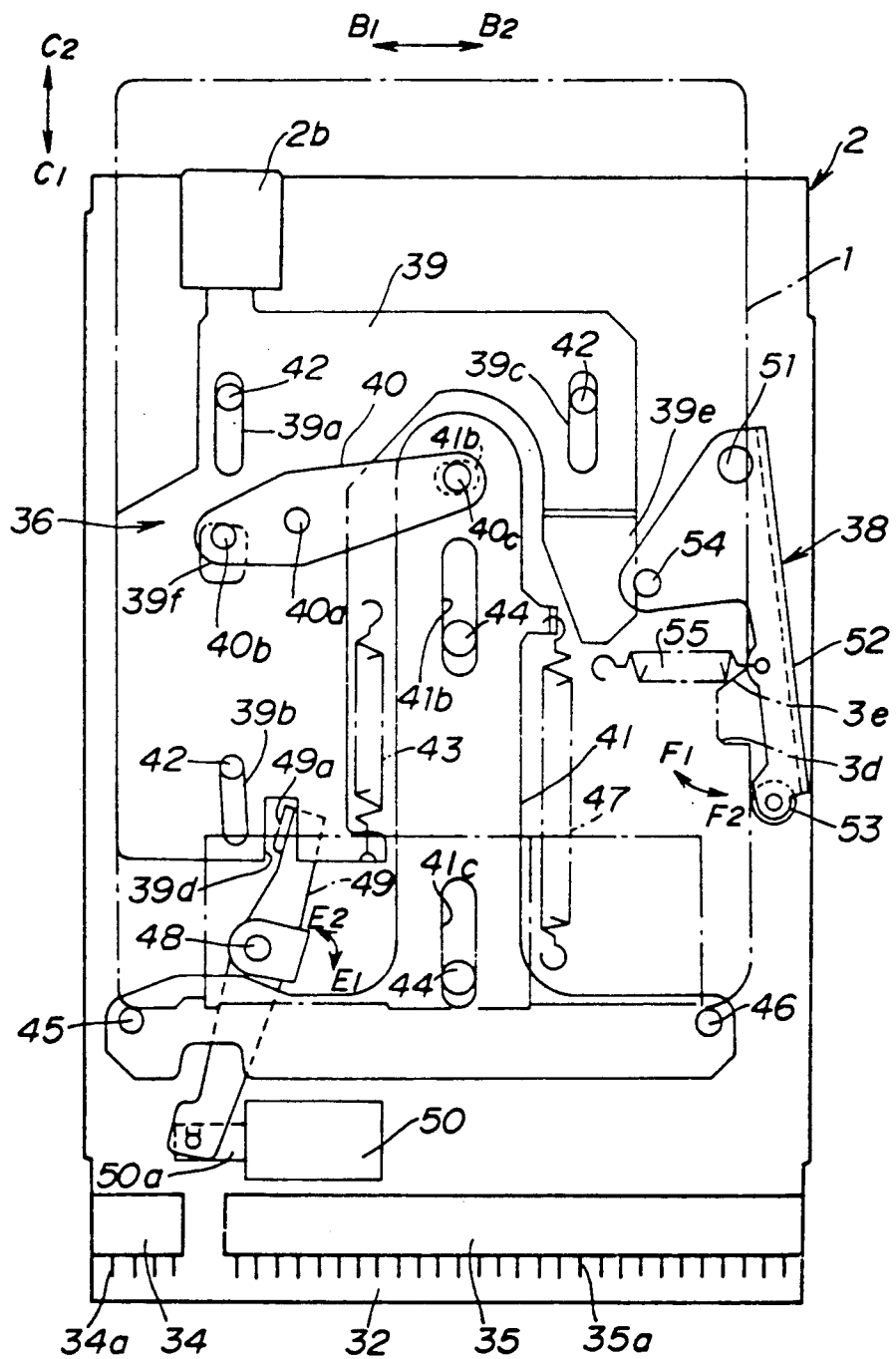
FIG. 12 is a plane view for explaining the ejecting operation.

The lock lever 52 is forced pivotably in a direction $F_1$ by the tensile force of the coil spring 55 which is engaged with the base plate 20a at its end thereof. The shaft 51 and the lock lever 52 do not block the inserting of the disk cartridge 1, whereas the roller 53 is located to block the disk, cartridge 1. When the disk cartridge 1 is inserted with the correct orientation, the corner 3f pushes out the roller 53 in the direction $F_2$. The corner 3f is chamferred with a large radius, so a point where the corner 3f touches the roller 53 is far from the lock lever 52. Therefore, because of a moment counterclockwise around the shaft 51 generated by the above touching, the roller 53 can rotate in the direction $F_2$. When the disk cartridge 1 is inserted completely, the lock lever 52 pivots in the direction $F_1$ by the spring 55, and the roller 53 is engaged with the lock-groove 3d to hold the disk cartridge 1 in the holder 20. Because of the inclined plane 3e, the roller 53 is easily engaged with the lock-groove 3d. Thus, the disk cartridge 1 is fixed at the predetermined position, and is connected with the driving device 2 electrically. As shown in FIG. 11 and FIG. 13, the shafts 51 are located opposite to each other. As shown in FIG. 10 and FIG. 12, the disk cartridge 1 is ejected as follows. The eject button 2b is pushed, and the pushing portion 39e of the eject lever 39 pushes the pin 54. Then the lock lever 52 is pivoted in the direction $F_2$ so that the roller 53 sets free the disk cartridge 1. When the disk cartridge 1 is inserted with the wrong orientation, in other words, when one of the corners 3g through 3i touches the roller 53, the roller 53 cannot be pushed out in the direction $F_2$ because it is smaller chamferred than the corner 3f. Because a point where one of the corners 3g through 3i touches the roller 53 is so close to the lock lever 52 a moment sufficient to rotate the roller 53 in the direction $F_2$ is not generated by the touching. Therefore the disk cartridge 1 is prevented from being mis-inserted in the vicinity of the roller 53. Since the roller 53 also holds the disk cartridge I inside the driving device 2, the mis-insert preventing mechanism according to the present invention serves two functions, despite its being comprised of only a few members.

The on-off shutter mechanism is a mechanism for opening the shutter 12, which is usually closed for protecting the connector 11 from dust, only when the connector 11 is connected with the connector 29.

Before explaining the on-off shutter mechanism 25, operation of the shutter 12 of the disk cartridge 1 will be described below. Referring to FIG. 4(A), FIG. 4(B) and FIG. 4(C), the connector 11 is enclosed and protected from dust by the shutter 12. The shutter 12 can be slid in a direction B along the side of the case 3. The shutter is slid by mechanism of engagement between two tabs 12a of the shutter 12 and a groove 14. As shown in FIG. 4(C), the groove 14 is located under the lower case 3b about the connector 11. The groove 14 comprises a spring chamber 14a, a guide portion 14b and a concave portion 14c. A torsion spring 13 is accommodated in the spring chamber 14a. And the guide portion 14b guides the tabs 12a in the direction B. The two tabs 12a are coupled with the shutter 12, and both engage with the groove 14. One end of the spring 13 is engaged with a hook 12b, and the other end is engaged with a concave portion 14c. Therefore the shutter 12 is forced by the spring 13 in the direction $B_1$ when the shutter 12 is slid in the direction $B_2$. The force of the spring 13 in the direction $B_1$ is not zero even when the shutter 12 is not slid so that the shutter 12 can always protect the connector 11 from dust.

Figure 8:
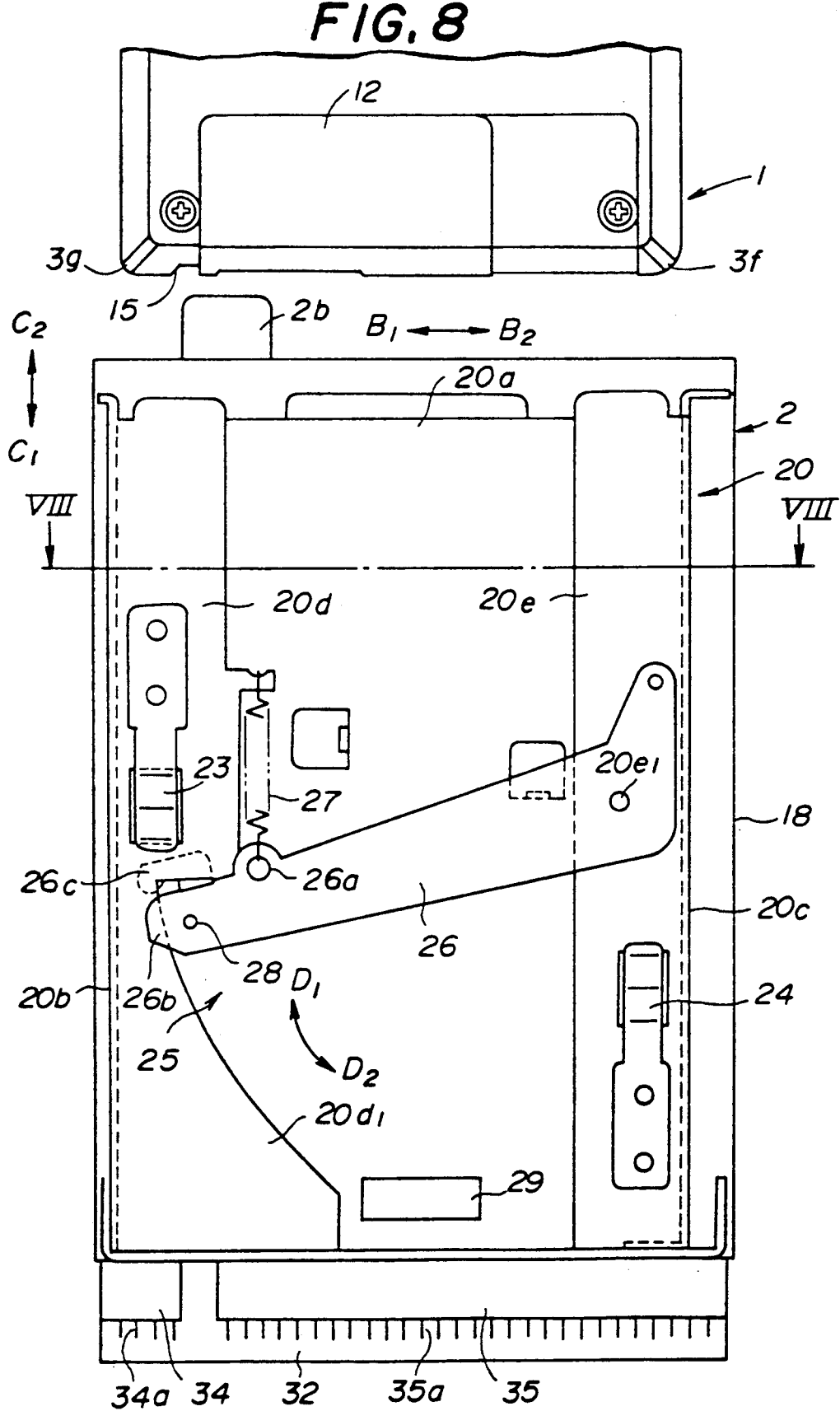
FIG. 8 is a plane view for explaining loading mechanism and on-off, shutter mechanism.

Next, the on-off shutter mechanism 25 will be described in detailed with reference to FIG. 8, FIG. 14 and FIG. 15. The on-off shutter mechanism 25 comprises a pivot lever 26, a coil spring 27 and a pin 28. The pivot lever 26 is mounted pivotably around an axis $20e_1$ on the crown plate 20e. The coil spring 27 is engaged with a hole 26a in the pivot lever 26 at one end thereof, and is engaged with the crown plate 20d at the other end thereof. Therefore the pivot lever 26 is forced by the spring 27 in the direction $D_1$. The pin 28 projects into the holder 20 at the top of the pivot lever 26. When the disk cartridge 1 is inserted, the pin 28 is inserted into an indentation 15 of the disk cartridge 1, and is engaged with one end of the shutter 12. As the disk cartridge 1 is inserted, the pivot lever 26 pivots around the axis $20e_1$, and slides along a arc $20d_1$. A hook 26c which extends from a top end 26b of the pivot lever 26 holds the crown plate 20c with the top end 26b so that the pivot lever 26 can always slide along the arc $20d_1$. The pin 28 slides the shutter 12 in the direction $B_2$ as the pivot lever 26 pivots. When a cutout portion 12c of the shutter 12 comes to a position corresponding to the connector 11, the pin 28 is engaged with a slot 16 which is formed on the indentation 15 so that the shutter 12 is locked at an opening position. Thus the connector 11 can be connected with the connector 29 of the driving device 2. The connector 29 is located on the base plate 20a, and the driving device is connected with a computer via connectors 34 and 35 with lots of connector pins 34a and 35a. The term "an opening position", as used herein, means a position where the connector 11 is laid bare. On the other hand, when the disk cartridge 1 is ejected, the shutter 12 is always locked at a closing position to protect the connector 11. Thus even when the disk cartridge 1 is ejected and carried, the case 3 is kept airtight. The term "a closing position", as used herein, means a position where the connector 11 is enclosed by the shutter 12.

The ejecting mechanism is a mechanism for ejecting the disk cartridge 1 which is inserted into the driving device 2. The eject mechanism 36 will be described with reference to FIG. 10, FIG. 12 and FIG. 15. As shown in FIG. 10, the eject mechanism 36 comprises the eject lever 39, a link 40 and a slider 41.

The eject lever 39 has slits 39a through 39c, and pins 42 which are mounted on the base plate 20a engaged with them. Therefore the eject lever 39 can be slid in the direction C. FIG. 15 shows the configuration between the base plate 20a and the eject lever 39. The eject lever is engaged with one end of a coil spring 43, the other end of which is engaged with the base plate 20a. Because the coil spring 43 is located in the direction $C_2$, the eject lever 39 is forced by the spring 43 in the direction $C_2$. The eject button 2b is attached at the top of the eject lever 39. The eject lever 39 has a gain 39d which is engaged with the mis-eject prevent mechanism described later, and the pushing portion 39e which is engaged with the mis-insert prevent mechanism 38 described above.

The link 40 is mounted pivotably around a shaft 40a which is supported between the eject lever 39 and the base plate 20a. The link 40 has pins 40b and 40c at the ends thereof respectively. The pin 40b is engaged with a hold 39f of the eject lever 39, and the pin 40c is engaged with a hole 41a of the slider 41.

The slider 41 is formed as a T-shape in the direction $C_1$. The slider 41 has slits 41b and 41c in the direction $C_1$. The slits 41b and 41c are engaged with pins 44 mounted on the base plate 20a. Therefore the slider 41 can be slid in the direction C. The slider 41 has eject pins 45 and 46 at the right and left ends of the T-shape thereof. The eject pins 45 and 46 are engaged with the end of the disk cartridge 1. The eject pins 45 and 46 project into the holder 20 through the entrances $20a_1$ and $20a_2$ of the base plate 20a. The slider 41 is engaged with one end of a coil spring 47, the other end of which is engaged with the base plate 20a. The coil spring 47 is located in the direction $C_1$, and the slider 41 is forced by the spring 47 in the direction $C_1$.

When the eject button 2b is pushed, as shown in FIG. 12, the eject lever 39 is moved in the direction $C_1$, and the pin 40b is forced in the direction $C_1$. As a result, the link 40 pivots counterclockwise around the shaft 40a on the basis of the principles of the lever, and the pin 40c is forced in the direction $C_2$. Thus, the pin 40c moves the slider 41 in the direction $C_2$, and as shown in FIG. 19, the eject pins 45 and 46 push the end of the disk cartridge 1 to eject. After ejecting, the eject lever 39 and the slider 41 is reset at the predetermined position respectively by means of tensile forces of springs 43 and 47.

Figure 16A:
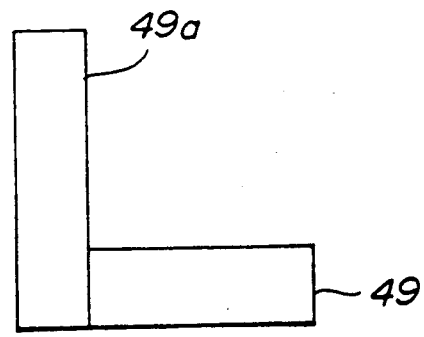
FIGS. 16(A) and FIG. 16(B) are respectively a front view and a side view for explaining a projection.
Figure 16B:
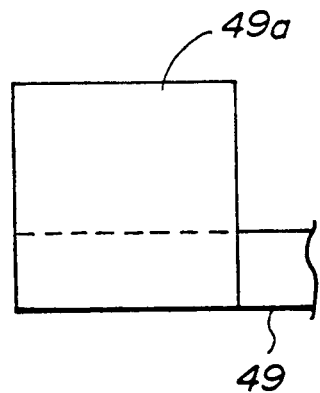

Lastly, the mis-eject preventing mechanism will be described below with reference to FIG. 10, FIG. 12 and FIG. 16. The mis-eject preventing mechanism is a mechanism for preventing the disk cartridge 1 from being ejected during recording or reproducing. The mis-eject preventing mechanism 37 comprises a lever 49 and a solenoid 50 which pivots the lever 49. The lever 49 is mounted pivotably around a shaft 48 which is supported on the base plate 20a. The lever 49 has a projection 49a at one end thereof, and is engaged with a plunger 50a of the solenoid 50 at the other end thereof. The projection extends upward so that the eject lever 39 can be moved in the direction $C_1$ and the disk cartridge 1 can be ejected only when the projection is engaged with the gain 39d of the eject lever 39. The projection 49a is formed like a rectangular plate as shown in FIG. 16(A) and FIG. 16(B), however it may be formed as other figures as long as it touches the ejecting lever when it is not engaged with the gain 39d. The solenoid 50 is magnetized while the heads 6a and 6b are located on tracks on the disk 4, and is erased magnetically while the heads 6a and 6b are located at the waiting position. Therefore while the heads 6a and 6b record or reproduce, the solenoid 50 is magnetized, and the lever 49 is pivoted in the direction $E_2$. Consequently the eject lever 39 touches the projection 49a and the disk cartridge cannot be ejected. However when recording or reproducing is over, the heads 6a and 6b are moved to the waiting position, so the solenoid 50 is erased magnetically. Consequently, as shown in FIG. 12, the lever 49 is pivoted in the direction $E_2$, and the projection 49a is engaged with the gain 39d to allow the disk cartridge 1 to be ejected.

Further, the present invention is not limited to these preferred embodiments, but various variations and modifications may be made without departing from the scope of the present invention.

What is claimed is:

1. A magnetic disk drive comprising:
   a disk cartridge; and a driving device into which said disk cartridge is inserted and from which said disk cartridge is ejected wherein said disk cartridge comprises;

a magnetic disk, and a magnetic head for recording information on said magnetic disk and/or reproducing information therefrom, and wherein said driving device comprises:

a housing, a connecting member mounted inside said housing, a holder, fixed to said connecting member, said holder having a load position therein, said disk cartridge being able to be inserted into said holder up to said load position and ejected from said holder, said magnetic disk and/or said magnetic head being able to be driven when said disk cartridge is inserted with a first orientation into said load position, a vibro-isolating member via which said holder is connected to said connecting member, said vibro-isolating member indirectly supporting said disk cartridge inserted into said holder, so as to prevent external vibration from being transmitted to said disk cartridge, a combining member having two ends, one end of which is combined with said holder and the other end of which is combined with said disk cartridge inserted into said holder, for combining said disk cartridge with said holder when said disk cartridge is inserted into said load position, and a current supply source from which electricity is supplied to said disk cartridge in order to drive said magnetic disk and/or said magnetic when said disk cartridge is inserted into said load position.

2. A magnetic disk drive according to claim 1, wherein said holder is fixed inside said housing.

3. A magnetic disk drive according to claim 1, wherein said vibro-isolating member comprises an elastic body.

4. A magnetic disk drive according to claim 1, wherein said connecting member is a wiring board having two ends which is connected with said current supply source at one end thereof and with said disk cartridge inserted into said holder at the other end thereof, in order to supply electricity to said disk cartridge.

5. A magnetic disk drive according to claim 4, wherein said combining member further comprises a second combining member, said second combining member pushing a surface almost vertical to a surface having a groove in order to combine said disk cartridge with said holder.

6. A magnetic disk drive according to claim 1, wherein said disk cartridge further comprises a groove at a side thereof, said combining member having a first combining member which is engageable with the groove.

7. A magnetic disk drive according to claim 1, wherein said driving device further comprises an information processor for receiving and/or transmitting the information recorded and/or reproduced by said magnetic head.

8. A magnetic disk drive according to claim 7, wherein said driving device further comprises a controller for controlling said driving of said magnetic disk and/or the magnetic head.

9. A magnetic disk drive according to claim 8, wherein said driving device further comprises:

a first driving device; and a second driving device, and wherein said first driving device further comprises said current supply source, and wherein said second driving device further comprises the information processor and the controller.

10. A magnetic disk drive according to claim 9, wherein said connecting member comprises a chassis for connecting said first driving device with said second driving device.

11. A magnetic disk drive comprising:

a disk cartridge; and a driving device into which said disk cartridge is inserted and from which said disk cartridge is ejected, wherein said disk cartridge comprises;

a magnetic disk, and a magnetic head for recording information on said magnetic disk and/or reproducing information therefrom, and wherein said driving device comprises;

a housing, a connecting member mounted inside said housing, a holder, fixed to said connecting member, said holder having a load position therein, said disk cartridge being able to be inserted into said holder up to said load position and ejected from said holder, said magnetic disk and/or said magnetic head being able to be driven when said disk cartridge is inserted with a first orientation into said load position, a vibro-isolating member via which said holder is connected to said connecting member, a combining member having two ends, one end of which is combined with said holder and the other end of which is combined with said disk cartridge inserted into said holder, for combining said disk cartridge with said holder when said disk cartridge is inserted into said load position, and a current supply source from which electricity is supplied to said disk cartridge in order to drive said magnetic disk and/or said magnetic head when said disk cartridge is inserted into said load position;

wherein said disk cartridge further comprises a groove at a side thereof, the combining member having a first combining member which is engageable with said groove;

wherein said disk cartridge is shaped like a substantially rectangular parallelpiped having at least one first corner chamfered with a first shape different from other chamfered corners, and wherein said first combining member is mounted to be movable from a first position to a second position in said holder, said first combining member having a second shape engaged with said first shape, said first combining member being located at said first position to block the inserting of said disk cartridge up to said load position before said disk cartridge is inserted up to said load position, and, when said disk cartridge is inserted with said first orientation, said first combining member being engaged with said first corner and then said first combining member moving to a second position to allow said disk cartridge to be inserted into said load position, said first combining member being engaged with said groove of said disk cartridge to hold said disk cartridge at said load position after said disk cartridge is inserted into said load position, whereas said first combining member stays at said first position to block said disk cartridge from being inserted when said disk cartridge is inserted with an orientation different from the first orientation because said first combining member cannot be engaged with one of said other corners different from said first corner.

12. A magnet disk drive according to claim 11, wherein said first corner, one of two corners to be first inserted, is chamferred with a radius larger than the other three corners.

13. A magnetic disk drive comprising:
a disk cartridge; and
a driving device into which said disk cartridge is inserted and from which said disk cartridge is ejected, wherein said disk cartridge comprises;
a magnetic disk, and
a magnetic head for recording information on said magnetic disk and/or reproducing information therefrom, and
wherein said driving device comprises;
a housing,
a connecting member mounted inside said housing,
a holder, fixed to said connecting member, said holder having a load position therein, said disk cartridge being able to be inserted into said holder up to said load position and ejected from said holder, said magnetic disk and/or said magnetic head being able to be driven when said disk cartridge is inserted with a first orientation into said load position,
a vibro-isolating member via which said holder is connected to said connecting member,
a combining member having two ends, one end of which is combined with said holder and the other end of which is combined with said disk cartridge inserted into said holder, for combining said disk cartridge with said holder when said disk cartridge is inserted into said load position, and
a current supply source from which electricity is supplied to said disk cartridge in order to drive said magnetic drive and/or said magnetic head when said disk cartridge is inserted into said load position;
wherein said first combining member further comprises:
a shaft arranged substantially vertical to an insertion direction of said disk cartridge and located out of an insertion path of said disk cartridge;
an arm having two ends arranged substantially parallel to the inserting direction of said disk cartridge and located out of the inserting way of said disk cartridge, said arm being coupled to said shaft at one end thereof so as to be pivotable around said shaft;
a spring member having two ends, one end of which is fixed by said holder, said other end of which is engaged with said arm, and said arm being forced by said spring member in order to block the inserting of said disk cartridge; and
an engaging member, which is engaged with the other end of the arm, and located at said first position even when said arm is arranged substantially parallel to the inserting direction of said disk cartridge.

14. A magnetic disk drive according to claim 13, wherein said disk cartridge has a groove at a surface thereof opposite to said first combining member, the engaging member being engaged with said groove by means of said spring member when said disk cartridge is inserted into a position where said first combining member at said second position is opposite to the groove.

15. A magnetic disk drive according to claim 4, wherein said driving device further comprises:
an eject button attached to a surface of the housing;
an eject member coupled to the eject button; and
a release member coupled to the eject button, the release member releasing said engaging of the engaging member with said groove in response to the pushing of said eject button, said eject member then ejecting said disk cartridge from said driving device.

* * * * *